United States Patent
Xiong et al.

(10) Patent No.: US 11,610,222 B1
(45) Date of Patent: Mar. 21, 2023

(54) LEAD USER QUALITY SCORE

(71) Applicant: Meta Platforms, Inc., Menlo Park, CA (US)

(72) Inventors: Hongzheng Xiong, Mountain View, CA (US); Vinay Ramesh Jain, Sunnyvale, CA (US)

(73) Assignee: Meta Platforms, Inc., Menlo Park, CA (US)

(*) Notice: Subject to any disclaimer, the term of this patent is extended or adjusted under 35 U.S.C. 154(b) by 763 days.

(21) Appl. No.: 15/906,294

(22) Filed: Feb. 27, 2018

(51) Int. Cl.
*G06Q 30/00* (2012.01)
*G06Q 30/0242* (2023.01)
*G06Q 30/0251* (2023.01)

(52) U.S. Cl.
CPC ..... *G06Q 30/0242* (2013.01); *G06Q 30/0255* (2013.01)

(58) Field of Classification Search
CPC ........... G06Q 30/0242; G06Q 30/0255; G06Q 30/0207–30/0277
USPC ...................................................... 705/14.41
See application file for complete search history.

(56) References Cited

U.S. PATENT DOCUMENTS

| | | | | |
|---|---|---|---|---|
| 2007/0244750 A1* | 10/2007 | Grannan | ................ | G06Q 30/02 705/14.64 |
| 2010/0114654 A1* | 5/2010 | Lukose | ............. | G06Q 30/0256 705/14.54 |
| 2012/0246033 A1* | 9/2012 | Keiser | .................... | G06Q 30/06 705/27.1 |
| 2014/0324537 A1* | 10/2014 | Gilbert | ............. | G06Q 10/06375 705/7.31 |
| 2015/0071427 A1* | 3/2015 | Kelley | ............... | G06Q 30/0201 379/265.09 |
| 2016/0171540 A1* | 6/2016 | Mangipudi | ........ | G06Q 30/0255 705/14.53 |
| 2017/0132688 A1* | 5/2017 | Freund | ............... | G06Q 30/0631 |
| 2017/0193506 A1* | 7/2017 | Karnati | ................ | G06Q 20/405 |
| 2017/0201779 A1* | 7/2017 | Publicover | .......... | G06F 16/2358 |
| 2018/0053208 A1* | 2/2018 | Upstone | ............. | G06Q 30/0245 |
| 2018/0150851 A1* | 5/2018 | Ouimet | .................. | G06Q 30/02 |
| 2019/0005547 A1* | 1/2019 | Tan | ........................ | G06F 16/435 |
| 2019/0205939 A1* | 7/2019 | Lal | ........................ | G06N 3/0454 |

OTHER PUBLICATIONS

Learning User Intent from Action Sequences on Interactive Systems by Rakshit Agrawal and Anwar Habeeb, Chih-Hsin Hsueh Stubhub arXiv:1712.01328v1 [cs.AI] Dec. 4, 2017 (Year: 2017).*

(Continued)

*Primary Examiner* — Sun M Li
(74) *Attorney, Agent, or Firm* — Fenwick & West LLP (57) ABSTRACT

Leads may be generated for content sponsors based on expressions of interest by users, the users being users of an online system. These leads typically require time or expense from a sponsor to follow up on the lead. The online system scores leads for sponsors to prioritize responding to the generated leads. The scores may include a purchase capacity score and a purchase intent score. The purchase capacity score estimates a user's ability to spend an amount specified by the sponsor for the product, and the purchase intent score estimates a user's likelihood to convert or be interested in the sponsor's product. The scores may be combined to provide a single lead quality score for a user that obscures the source of the online system's prediction to the sponsor.

19 Claims, 3 Drawing Sheets

| Lead | Lead Quality Score |
|---|---|
| Bob | 75 |
| Greg | 50 |
| ... | ... |

Leads 304
Lead Quality Scores 312

(56) References Cited

OTHER PUBLICATIONS

J. A. Calandrino, A. Kilzer, A. Narayanan, E. W. Felten and V. Shmatikov, ""You Might Also Like:" Privacy Risks of Collaborative Filtering," 2011 IEEE Symposium on Security and Privacy, 2011, pp. 231-246, doi: 10.1109/SP.2011.40. (Year: 2011).*

* cited by examiner

LEAD USER QUALITY SCORE

BACKGROUND

The present disclosure relates to assessing leads, and specifically, to ranking leads according to quality.

Sponsors of products have limited resources (people, time, number of products, etc.). The sponsors may generate or collect leads that represent people who have an interest in the product. With the ability to reach high numbers of people through the internet, high numbers of leads may be generated. A sponsor may have a number of leads that exceeds the sponsor's capability to assess or pursue the leads. This may result in unpursued high quality leads and pursued low quality leads.

A lead represents a user or business that has expressed interest in a product sold by a sponsor. Leads can be generated through lead campaigns, however lead campaigns are often focused on generating high numbers of leads. Often, sponsors do not have the necessary information to assess the quality of the generated leads. Additionally, the collective resources required by a sponsor to pursue all generated leads may exceed the available resources of the sponsor. As a result, some sponsors, such as automotive vehicle sales and educational institutions, desire an ability to distinguish the quality of leads.

SUMMARY

Often sponsors lack sufficient information about a user to effectively evaluate leads. Even when users may have indicated strong interest in a form, more information may be useful or necessary to evaluate the lead. The online system may have additional information that could impact lead evaluation, however, this information cannot be shared with the sponsor due to privacy restrictions.

An online system may score leads relating to users of the online system for sponsors. The scores allow the sponsor to prioritize the leads without the online system sharing privacy protected user information. The scores indicate the likelihood of actual purchase for each lead and may account for both capacity and interest in the sponsor's product. The online system may return lead scores with leads generated by a lead campaign hosted by the online system, or the sponsor may submit leads to the online system for the online system to score.

The score related to each lead is referred to as a lead quality score. The lead quality score is determined by factors, indicators, or scores based upon information from the online system and sponsor. A lead quality scores can be based upon a purchase capacity score and a purchase intent score.

The purchase capacity score estimates a user's ability and likelihood to spend an amount, specified by the sponsor, for the product. The online system determines a user's ability to spend the amount to purchase the product. In some embodiments the user's ability to spend the amount is determined by the activity of the user, such as purchasing history, purchasing habits, job history, living location, work location, social associations, and travel habits. The online system determines a user's likelihood to spend the amount by comparing historical purchasing data of purchasers of the product with information of the user. For example, a user may have demographic information similar to demographic information of average purchasers of the product. In some embodiments, the historical purchasing data is supplied by the sponsor. The information of the user can be supplied by the online system, the sponsor, or the lead itself.

The purchase intent score estimates a user's likelihood to convert or interest in the sponsor's product. For example, the purchase intent score estimates the user's interest in the product over other products. In another example, the purchase intent score estimates the user's likelihood in purchasing the product if the user has the capabilities to purchase the product. In some embodiments the purchase intent score is based on store visits, brand polling, visits to the sponsor's website, and views of the product on the online system website.

After calculating the purchase intent score and purchase capacity score, the scores may be combined to provide a single lead quality score for the lead. The method in this disclosure may be advantageous because the lead quality score obscures the source and method of the online system's prediction. Furthermore, the online system does not give or disclose the user information that the lead quality score is based upon.

The online system may do this due to user privacy restrictions. By obscuring the method, scores, and information that the lead quality score is based upon, the online system can use all of the resources and information, which are available to the online system but are not unavailable to the sponsor, to calculate the lead quality score. For example, the online system may use privacy protected information, such as user activity and user purchase history, to determine the lead quality score while preventing disclosure of this information to the sponsor.

After the lead quality scores are determined for each lead, the lead quality scores are sent to the sponsor. The online system may also send the associated leads if the sponsor does not possess the leads. The lead quality scores allows the sponsor prioritize the leads. The lead quality scores may also be used to target users for future lead campaigns or lead generation.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements.

System Architecture

Figure 1:
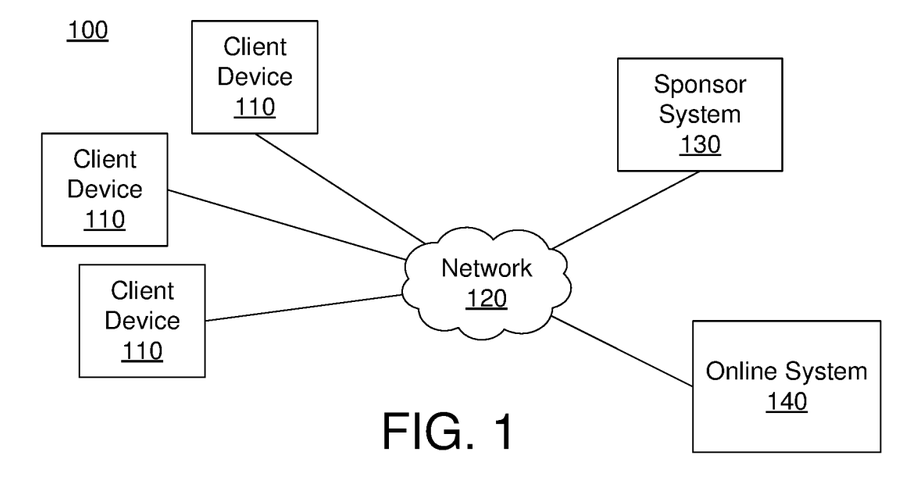
FIG. 1 is a block diagram of a system environment in which an online system operates, according to one embodiment.

FIG. 1 is a block diagram of a system environment 100 for an online system 140. The system environment 100 shown by FIG. 1 comprises one or more client devices 110, a network 120, one or more sponsor systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network XX20 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more sponsor systems 130 may be coupled to the network 120 for communicating with the online system 140. In one embodiment, a sponsor system 130 is an application provider communicating information describing applications for execution by a client device 110 or communicating data to client devices 110 for use by an application executing on the client device. In other embodiments, a sponsor system 130 provides content or other information for presentation via a client device 110. A sponsor system 130 may also communicate information to the online system 140, such as advertisements, content, or information about an application provided by the sponsor system 130.

Online System

Figure 2:
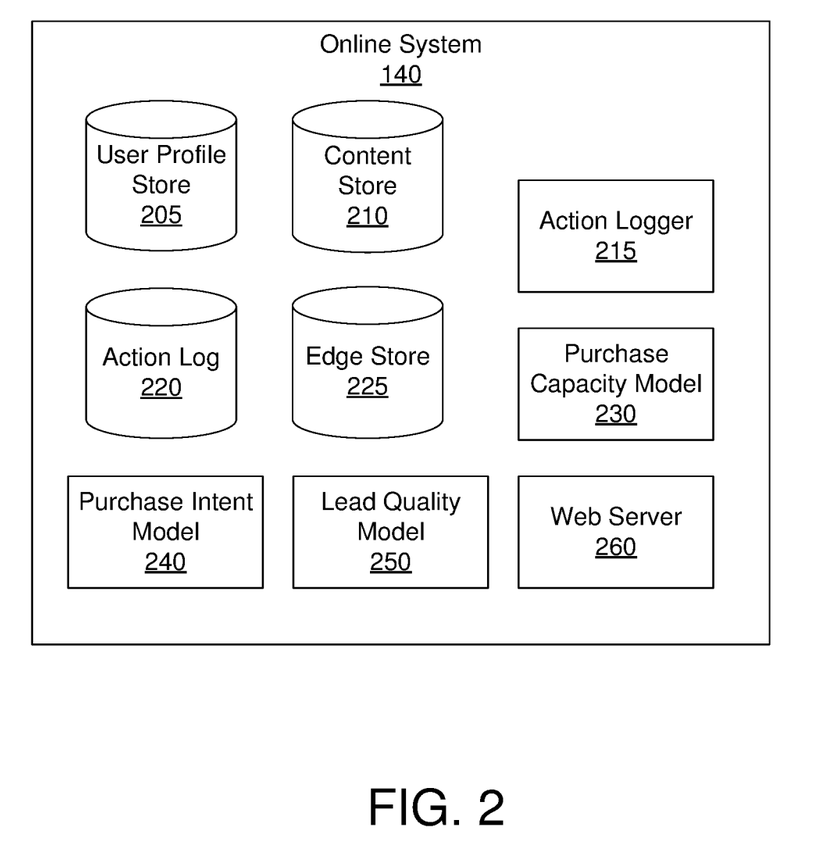
FIG. 2 is a diagram of the online system, according to one embodiment.

FIG. 2 is a block diagram of an architecture of the online system 140. The online system 140 shown in FIG. 2 includes a user profile store 205, a content store 210, an action logger 215, an action log 220, an edge store 225, a purchase capacity model 230, purchase intent model 240, lead quality model 250, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, current educational state, gender, age, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

The information in the user profile store 205 can be used by the online system 140 to determine lead quality scores, purchase capacity scores, and purchase intent scores. In some embodiments, the purchase capacity model 230 uses information in the user profile store 205 to determine a purchase capacity score. For example, user information (e.g., age or educational history) of a user is compared with historical purchasing data of purchasers of a product. The historical purchasing data may be given by the sponsor system 130. In some embodiments, the purchase intent model 240 uses information in the user profile store 205 to determine a purchase intent score. For example, a user's hobbies or interests may be used as input to calculate a purchase intent score.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile, and allowing a more complete understanding of user preferences.

The action log 220 may also store user actions taken on a sponsor system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a sponsor system 130, including webpage viewing histories, advertisements that were engaged, purchases made, and other patterns from shopping and buying. Additionally, actions a user performs via an application associated with a sponsor system 130 and executing on a client device 110 may be communicated to the action logger 215 by the application for recordation and association with the user in the action log 220.

Information stored in the action log 220 can be used by the online system 140 to determine lead quality scores, purchase capacity scores, and purchase intent scores. For example, a user checking-in at a store location of a sponsor system 130 increases a purchase intent score relating to products stored in the store location. In another example, a user sharing links relating to a product increases a purchase intent score relating to the product. In another example, a user visiting a website of a sponsor system 130 increases a purchase intent score relating to products sold by the sponsor system 130. In some embodiments, the purchase capacity model 230 uses information in the action log 220 to determine a purchase capacity score. For example, a user who frequently posts check-in locations at airports increases purchase capacity scores relating to a travel products.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The purchase capacity model 230 determines a purchase capacity score which estimates a user's ability and likelihood to spend an amount specified by the sponsor system 130 for a product. For a given user who has expressed interest in a product, the online system determines the user's ability to spend the amount to purchase the product. The purchase capacity model 230 can use information from the user profile store 205, content store 210, action log 220, and edge store 225 to determine a user's purchasing capabilities. For example, the purchase capacity model 230 may consider user activity such as purchasing history, purchasing habits, job history, living location, work location, social associations, and travel habits. This information is stored on the online system 140 and may be referred to as "historical data." The purchase capacity model 230 also determines a user's capacity to buy the product by comparing historical purchasing data with user information of the user (e.g., demographic information stored in the user profile store 205). Historical purchasing data describes conversion rates of past purchasers of the product and demographics of the past purchasers. For example, historical purchasing data for a particular make and model of car may include age, income, gender, and resident city for purchasers of the car. As such, by comparing a user's information with historical purchasing data for a product, the purchase capacity model 230 can better estimate the user's purchasing capabilities for that product. For example, if a user of a lead has an age and income that is similar to the average age and income of purchasers of the product, the lead may be assigned a high purchase capacity score. In some embodiments, the historical purchasing data can be supplied by the sponsor system 130 or the online system 140. The user information of the user of the lead can be supplied by the online system 130 or the sponsor 140.

For a given a user and product, the purchase intent model 240 determines a purchase intent score. The purchase intent score estimates the user's likelihood to convert represented by interest in the sponsor's product. For example, the purchase intent score estimates the user's interest in the product over other products. In another example, the purchase intent score estimates the user's likelihood in purchasing the product if the user has the capabilities to purchase the product. The purchase intent model 240 can use information from the user profile store 205, content store 210, action log 220, and edge store 225 to determine a user's interest in the product. For example, the purchase intent model 240 may consider visits to a store or website of the sponsor system 130, brand polling, and views of the product on the online system website.

The lead quality model 250 determines the lead quality score, which indicates the likelihood of purchase of a product by a user. A lead quality score may comprise several scores that are all determined by the lead quality model 250. The lead quality model 250 uses the purchase capacity score from the purchase capacity model 230 and the purchase intent score from the purchase intent model 240 to calculate the lead quality score for a given lead. In some embodiments, a lead quality score depends on other scores, in addition to the purchase capacity score and purchase intent score. The lead quality model 250 can be updated by feedback from the sponsor system 130 or online system 140. For example, after providing lead quality scores to the sponsor system 130, the sponsor system 130 may give a list of the users that purchased the product.

In some embodiments, the purchase capacity model 230, purchase intent model 240, and the lead quality model 250 each determine a weighted aggregate value corresponding to, respectively, the purchase capacity score, purchase intent score, and lead quality score. In these embodiments, each model 230, 240, 250 comprises weights for feature scores corresponding to various features extracted by each model 230, 240, 250 and instructions for determining a weighted aggregate value based on the weights and a feature vector. The weights are predetermined constant values or configurable values. The weights may be provided by a user, for example, an expert user who has domain knowledge for determining weights of various extracted features.

In some embodiments, each model 230, 240, 250 is a trained machine learning based model. Furthermore, the machine learning based models may be unique for each user of the online system 140. Each model 230, 240, 250 may be a tree-based model, a model based on kernel methods, neural networks, splines, or an ensemble of one or more of these techniques. In this embodiment, weights may be determined from various extracted features based on training data.

In some embodiments, the models 230-250 determine several scores for a single lead. These scores can indicate outputs from various prediction models (e.g., one score determined from a weighted aggregate model and another score determined from a machine learning model). These scores can also indicate variations in input. For example, one lead quality score may indicate a likelihood of the user purchasing the product within a year and another lead quality score may indicate a likelihood of the user purchasing the product within five years. In another example, one lead quality score may indicate a likelihood of the user purchasing the product at full price and another lead quality score may indicate a likelihood of the user purchasing the product at a discounted price The web server 206 links the online system 140 via the network 120 to the one or more client devices 110, as well as to the one or more third party systems 130. The web server 260 serves web pages, as well as other content, such as JAVA®, FLASH®, XML, and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, or BlackberryOS.

System Overview

Figure 3:
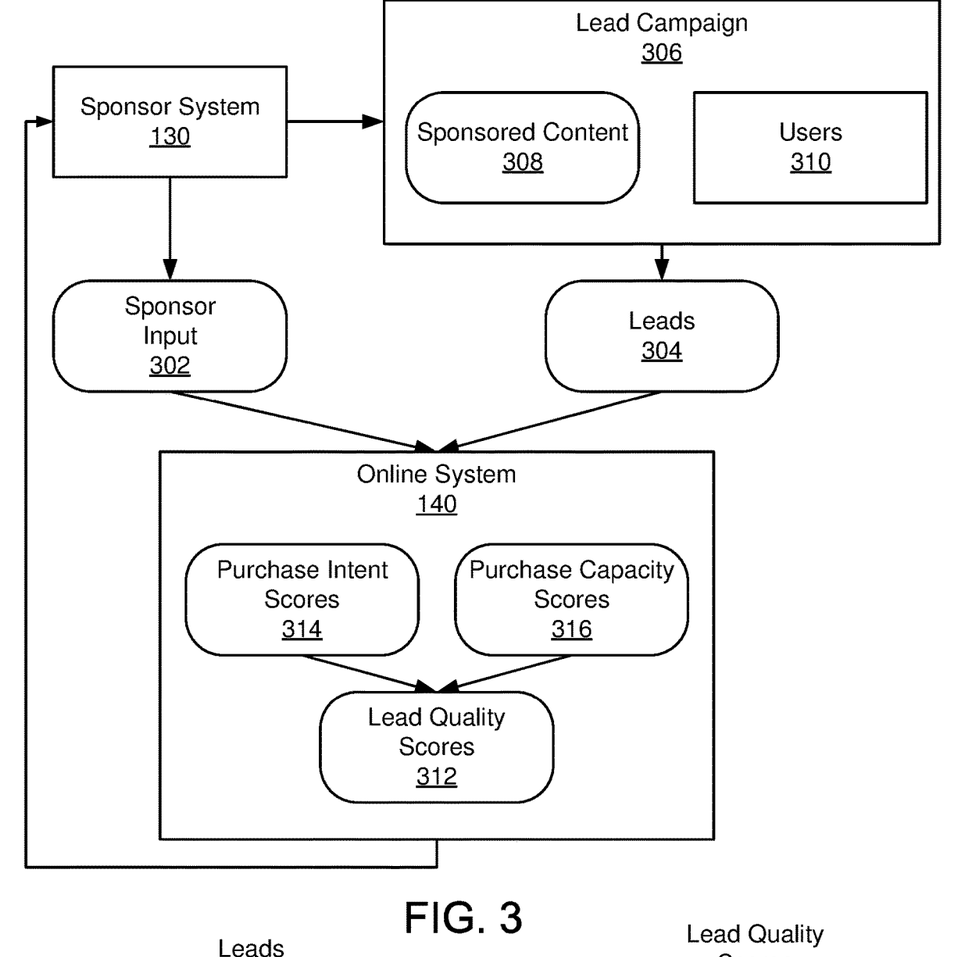
FIG. 3 is a diagram of a system environment for generating lead quality scores, according to one embodiment.

FIG. 3 is a diagram of a system environment for generating lead quality scores 312, according to one embodiment. The online system 140 uses sponsor input 302, leads 304, and internal information to generate lead quality scores 312. The environment includes the sponsor system 130, the online system 140, a lead campaign 306, sponsored content 308, users 310, sponsor input 302, leads 304, purchase intent scores 314, purchase capacity scores 116, and lead quality scores 312. Some embodiments of the system environment have different and/or other modules than the ones described herein. The functions can be distributed among the modules in a different manner than described in FIG. 3.

The sponsor system 130 is a sponsor of a product that desires lead quality scores 312 associated to the leads 304. To initiate leads 304, the sponsor system 130 sponsors the lead campaign 306 to generate leads 304 corresponding to users 310 expressing interest in the product. To initiate the lead quality scores 312, the sponsor system 130 sends sponsor input 302 to the online system 140. After the lead quality scores 312 are determined, the sponsor system 130 receives the lead quality scores 312 from the online system 140. Additionally, if the sponsor system 130 does not already have access to the leads 304, the leads 304 are sent to the sponsor system 130.

The sponsor input 302 includes information that can be used by the online system 140 to calculate the purchase intent scores 314, the purchase capacity scores 316, and the lead quality scores 312. The sponsor input 302 includes an amount that indicates the cost of the product and general product information (e.g., product features, availability, etc.). Depending on the product and the priorities of the sponsor system 130, the amount can be a range of values (e.g., a car has multiple prices depending upon available features), a minimum or maximum cost threshold, or a single value. The sponsor input 302 also includes historical purchasing data that includes conversion rates of purchasers based upon demographics of the purchasers. For example, an automotive vehicle sponsor provides the conversion rates of past purchasers based upon age and nationality. A purchaser is person or business who previously purchased the product or a similar product. The demographics may include age, nationality, income, location information, and education. The historical purchasing data may also include other general information, such as seasonal purchasing habits of purchasers.

A lead campaign 306 exposes users 310 to sponsored content 308 to generate and collect leads 304. A lead campaign 306 can include marketing efforts, such as surveys, trade shows, and direct mailings. A lead campaign 306 may be hosted by the sponsor system 130, the online system 140, or a third-party system (not seen in FIG. 3). For example, a lead campaign 306 includes users 310 responding to sponsored content 308 presented by the online system 140. In another example, a lead campaign 306 includes users 310 submitting forms expressing interest in the product. In some embodiments, lead campaigns 306 target certain users 310. For example, a lead campaign 306 may target users 310 interested in purchasing an automotive vehicle.

The sponsored content 308 is content sponsored by the sponsor system 130 that relates to the product sponsored by the sponsor system 130. For example, the sponsored content 308 includes advertisements. In another example, sponsored content 308 includes a website of the sponsor system 130.

The user 310 is a person or business of the online system 140 who is exposed to sponsored content 308 during a lead campaign 306.

A lead 304 represents a user or business that has expressed interest in a product sold by the sponsor system 130. A lead 304 can be based upon form submissions, responses to sponsored content, or other expressions of interest by a user 310. For example, a user may express interest in a product by filling out a product survey. A lead 304 may include data associated with the user, such as user 310 contact information, which was collected during lead 304 generation. A lead 304 can be generated through one or more lead campaigns 306.

The online system 140 determines lead quality scores 312 corresponding to the leads 304 for the sponsor system 130. This allows the sponsor system 130 to prioritize responding to the leads 304 generated from the lead campaign 306. Before determining the lead quality scores 312, the online system 140 may determine purchase intent scores 314 and purchase capacity scores 316 for each lead 304. To determine the purchase intent scores 314 and the purchase capacity scores 316, the online system 140 receives the leads 304 generated from the lead campaign 306 and the sponsor input 302 from the sponsor system 130.

For a given lead 304, the purchase capacity score 316 estimates a user's 310 ability and likelihood to spend an amount that indicates the cost of the product. The purchase capacity model 230 determines a user's 310 capacity to spend the amount to purchase the product. In some embodiments the user's 310 ability to spend the amount is determined by the activity of the user 310 on the online system 140 or from information about the user 310 collected by the online system 140, such as purchasing history, purchasing habits, job history, living location, work location, social associations, and travel habits. The purchase capacity model 230 also determines a user's likelihood to spend the amount by comparing historical purchasing data of purchasers with information of the user 310. As previously described, the historical purchasing data of purchasers is included in the sponsor input 302. The demographic information of the user 310 can be supplied by the online system 140, the sponsor system 130, or the lead 304 itself. Based on the user's 310 ability and likelihood to spend the amount, the online system 140 determines a purchase capacity score 316 by executing the purchase capacity model 230.

For a given lead 304, the purchase intent score 314 estimates a user's 310 likelihood to convert or interest in the product of the sponsor system 130. For example, the purchase intent score 314 estimates the user's 310 interest in the product over other products. In another example, the purchase intent score 314 estimates the user's 310 likelihood in purchasing the product if the user has the capabilities to purchase the product. The purchase intent score 314 is determined by the purchase intent model 240. In some embodiments, the purchase intent score 316 is based on user 310 interests (e.g., "likes" on the online system 140), store visits, location (e.g., does the user 310 work or live near a product store of the sponsor system 130?), brand polling, visits to the sponsor's website, and views of the product on the online system 140. This information may be supplied by the sponsor system 130, the lead 304, or the online system 140. Based upon this information, the online system 140 determines purchase intent scores 314 by executing the purchase intent model 240.

After calculating the purchase intent score 314 and purchase capacity score 316, the scores may be used to determine a single lead quality score 312, for a given lead 304. Lead quality scores 312 are one or more values that indicate the likelihood of actual purchase of the product for each lead 310 and account for both capacity and interest in the product. Lead quality scores 312 are determined by the lead quality model 250. In embodiments where the online system 140 hosts the lead campaign 306, the lead quality model 250 may determine a lead score 312 after each lead 304 is generated. After one or more lead quality scores 312 are determined, the scores are sent to the sponsor system 130. This allows the sponsor system 130 to prioritize which leads 304 according to likelihood of purchase.

The lead quality scores 312 may also be used to target users 310 for future lead campaigns 306. For example, users 310 associated to leads 304 with high lead quality scores 312 may be targeted in other lead campaigns 306. The lead quality scores 312 may also be used as a measure of lead campaign 306 effectiveness. For example, if a lead campaign 306 produces high lead quality scores 312 relative to another lead campaign 306, then the sponsor system 130 may apply the methods used by first lead campaign 306 in future lead campaigns 306.

Example of Lead Quality Scores

Figure 4:
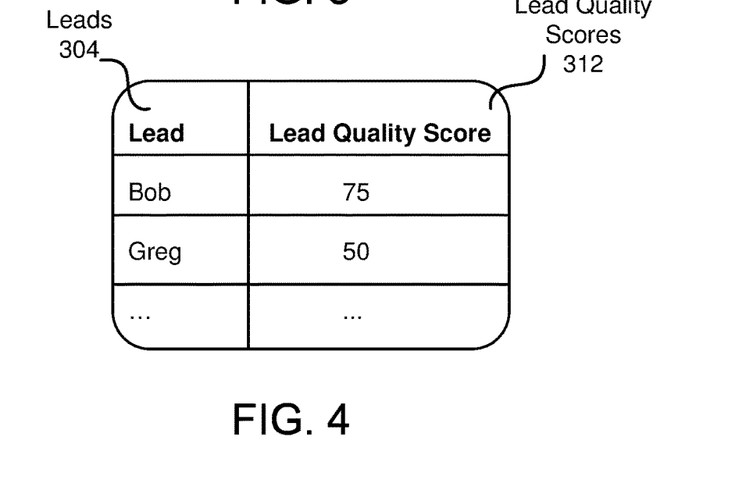
FIG. 4 is diagram of lead quality scores, according to one embodiment.

FIG. 4 is diagram of lead quality scores 312, according to one embodiment. The online system 140 combined the lead quality scores 312 with the leads 304. FIG. 4 depicts lead quality scores 312 as they may be received by the sponsor system 130. FIG. 4 may contain more or less lead quality scores 312. For each lead 304, the lead quality score 312 may contain one or more scores. The method and information used to determine the lead quality scores 312 associated with the leads 304 is obscured from the sponsor system 130. By obscuring the method and information that the lead quality scores 312 are based on, the online system 140 can use information to calculate the lead quality scores 312 without disclosing privacy protected information to the sponsor system 130.

Process for Generating Lead Quality Scores

Figure 5:
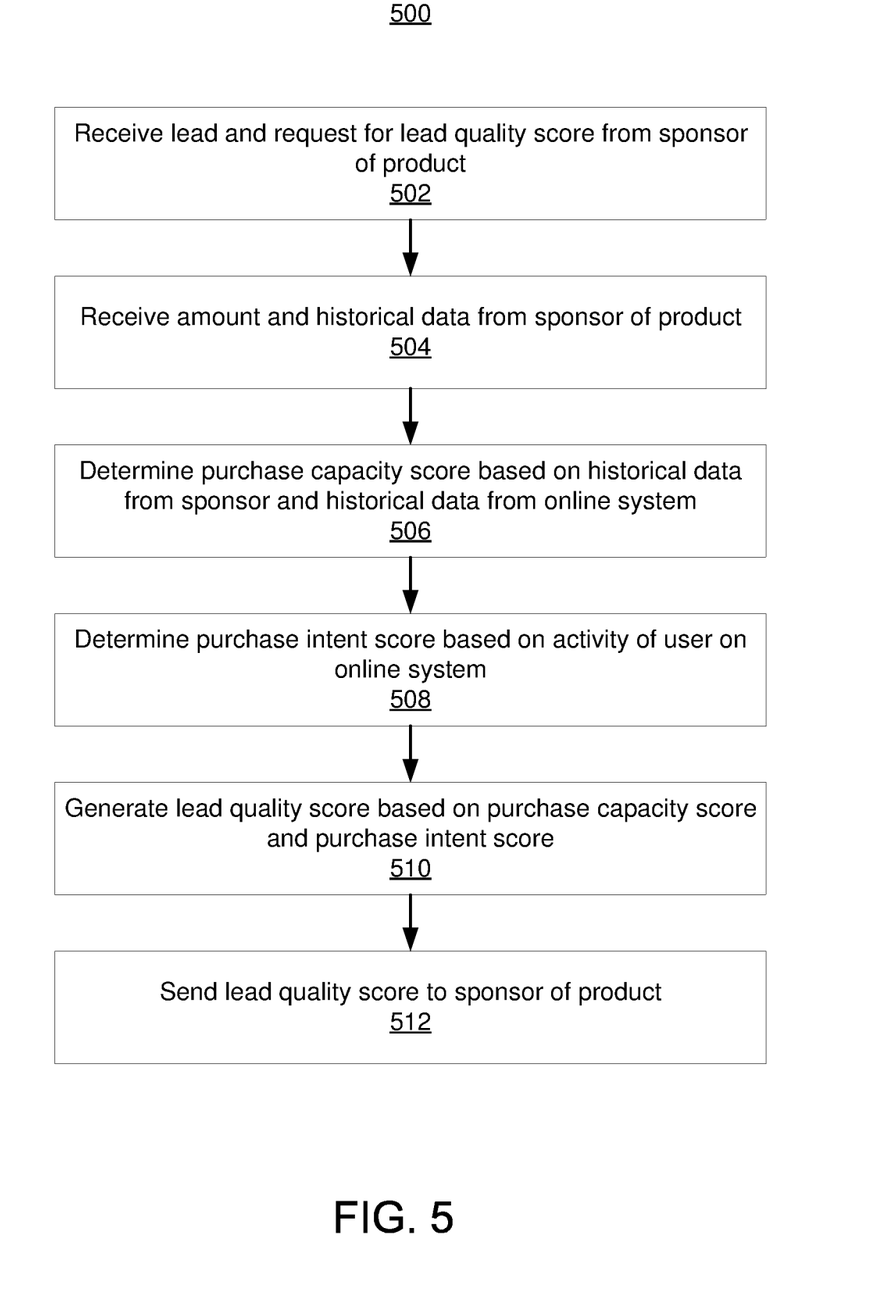
FIG. 5 is a flowchart of a method for determining lead quality scores, according to one embodiment.

FIG. 5 is a flowchart of the process for generating a lead quality score 312, according to one embodiment. The process may include different or additional steps than those described in conjunction with FIG. 5. The process may perform steps in different orders than the order described in conjunction with FIG. 5.

The online system 140 receives 502 a lead 304 and a request for a lead quality score 312 from a sponsor system 130 of a product. The lead is a user of the online system 140 who expressed interest in the product. The lead quality score 312 is associated with the lead 304 and indicates the likelihood of purchase of the product by the user of the online system 140.

The online system 140 receives 504 an amount and historical purchasing data from the sponsor system 130 of the product. The amount indicates a price range of the product, and the historical purchasing data includes, at least, conversion rates of past purchasers of the product and demographics of the past purchasers.

The online system 140 determines 506 a purchase capacity score 316 based on the historical purchasing data from the sponsor system 130 and historical data stored by the online system 140. The purchase capacity score 316 indicates the user's 310 ability to spend the amount specified by the sponsor system 130 of the product. The purchase capacity score 316 can be determined by a purchase capacity model. The historical data stored by the online system 140 can include activity of the user, such as purchasing history, purchasing habits, job history, living location, work location, social associations, and travel habits. The historical data can include activity of the user on or off the online system 140.

The online system 140 determines 508 the purchase intent score 314 based on activity of the user 310 on the online system 140. The purchase intent score 314 indicates a user's 310 interest in the product, based on the activity of the user 310 on the online system 140. The purchase intent score 314 may also be based on activity of the user 310 outside of the online system 140. The purchase intent score 314 can be determined by a purchase intent model 240.

The online system 140 generates 510 the lead quality score 312 based on the purchase capacity score 316 and the purchase intent score 314. The lead quality score 312 can be determined by a lead quality model 250.

The online system 140 sends 512 the lead quality score 512 to the sponsor system 512 of the product.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    receiving a lead and a request for a lead quality score from a sponsor of a product, the lead being a user of an online system who indicated interest in the product, and the lead quality score being associated with the lead and indicating the likelihood of purchase of the product by the user of the online system;
    receiving an amount and historical purchasing data from the sponsor of the product, the amount indicating a price range of the product, and the historical purchasing data including conversion rates of past purchasers of the product and demographics of the past purchasers;
    predicting, by a purchase capacity model, a purchase capacity score, the purchase capacity score indicating the user's ability to spend the amount specified by the sponsor of the product, wherein the purchase capacity model is a machine learning model trained using the historical data received from the sponsor compared to historical data relating to the user stored by the online system;
    predicting, by a purchase intent model, a purchase intent score, the purchase intent score indicating a user's interest in the product, wherein the purchase intent model is a machine learning model trained using the activity of the user on the online system;
    generating, by a lead quality model, a lead quality score associated with the lead and based, in part, on the purchase capacity score and purchase intent score, the lead quality score indicating likelihood of purchase of the product by the user of the online system based on capacity and interest in the product;
    hiding the historical purchasing data, the purchase capacity score, the purchase intent score, and the method determining the lead quality score, from the sponsor for the product; and
    sending the lead quality score associated with the lead to the sponsor for the product, such that the sponsor does not receive user information on which the lead quality score is based.

2. The method of claim 1, further comprising:
    receiving feedback from the sponsor for the product, the feedback indicating whether the user of the online system purchased the product; and
    updating the purchase capacity model and the purchase intent model based upon the sponsor feedback.

3. The method of claim 1, wherein the method for determining the lead quality score is hidden from the sponsor because of user privacy restrictions.

4. The method of claim 1, wherein the lead is based on form submissions or responses to sponsored content viewed by the user.

5. The method of claim 1, wherein the historical data stored by online system includes the user's education, friends, age, and past purchasing transactions.

6. The method of claim 1, wherein the purchase intent score also is based on store visits, verbal interest, and brand polling.

7. The method of claim 1, wherein the purchase intent score and purchase capacity score are not conveyed to the sponsor of the product.

8. The method of claim 1, wherein the historical data relating to the user stored by the online system and the activity of the user on the online system are not shown to the sponsor of the product.

9. The method of claim 1, wherein the lead quality score is used to assess the effectiveness of a lead campaign that generated the lead associated to the lead quality score.

10. A non-transitory computer-readable storage medium comprising stored instructions for:
    receiving a lead and a request for a lead quality score from a sponsor of a product, the lead being a user of an online system who indicated interest in the product, and the lead quality score being associated with the lead and indicating the likelihood of purchase of the product by the user of the online system;
    receiving an amount and historical purchasing data from the sponsor of the product, the amount indicating a price range of the product, and the historical purchasing data including conversion rates of past purchasers of the product and demographics of the past purchasers;
    predicting, by a purchase capacity model, a purchase capacity score, the purchase capacity score indicating the user's ability to spend the amount specified by the sponsor of the product, wherein the purchase capacity model is a machine learning model trained using the historical data received from the sponsor compared to historical data relating to the user stored by the online system;
    predicting, by a purchase intent model, a purchase intent score, the purchase intent score indicating a user's interest in the product, wherein the purchase intent model is a machine learning model trained using the activity of the user on the online system;
    generating, by a lead quality model, a lead quality score associated with the lead and based, in part, on the purchase capacity score and purchase intent score, the lead quality score indicating likelihood of purchase of the product by the user of the online system based on capacity and interest in the product;
    hiding the historical purchasing data, the purchase capacity score, the purchase intent score, and the method determining the lead quality score, from the sponsor for the product; and
    sending the lead quality score associated with the lead to the sponsor for the product, such that the sponsor does not receive user information on which the lead quality score is based.

11. The non-transitory computer-readable storage medium of claim 10, further comprising:
    receiving feedback from the sponsor for the product, the feedback indicating whether the user of the online system purchased the product; and
    updating the purchase capacity model and the purchase intent model based upon the sponsor feedback.

12. The non-transitory computer-readable storage medium of claim 10, wherein the method for determining the lead quality score is hidden from the sponsor because of user privacy restrictions.

13. The non-transitory computer-readable storage medium of claim 10, wherein the lead is based on form submissions or responses to sponsored content viewed by the user.

14. The non-transitory computer-readable storage medium of claim 10, wherein the historical data stored by online system includes the user's education, friends, age, and past purchasing transactions.

15. The non-transitory computer-readable storage medium of claim 10, wherein the purchase intent score also is based on store visits, verbal interest, and brand polling.

16. The non-transitory computer-readable storage medium of claim 10, wherein the purchase intent score and purchase capacity score are not conveyed to the sponsor of the product.

17. The non-transitory computer-readable storage medium of claim 10, wherein the historical data relating to the user stored by the online system and the activity of the user on the online system are not shown to the sponsor of the product.

18. The non-transitory computer-readable storage medium of claim 10, wherein the lead quality score is used to assess the effectiveness of a lead campaign that generated the lead associated to the lead quality score.

19. A computer-implemented method comprising:
- receiving leads from a lead campaign and a request for lead quality scores from a sponsor of a product, each lead being a user of an online system who indicated interest in the product, and each lead quality score being associated with a lead and indicating the likelihood of purchase of the product by the user of the lead of the online system;
- receiving an amount and historical purchasing data from the sponsor of the product, the amount indicating a price range of the product, and the historical purchasing data including conversion rates of past purchasers of the product and demographics of the past purchasers;
- predicting, by a purchase capacity model, purchase capacity scores, each purchase capacity score indicating a user's ability to spend the amount specified by the sponsor of the product, wherein the purchase capacity model is a machine learning model trained using the historical data received from the sponsor compared to historical data relating to a user stored by the online system;
- predicting, by a purchase intent model, purchase intent scores, each purchase intent score indicating a user's interest in the product, wherein the purchase intent model is a machine learning model trained using the activity of the user on the online system;
- generating, by a lead quality model, lead quality scores associated with the leads and based, in part, on the purchase capacity scores and purchase intent scores, the lead quality score indicating likelihood of purchase of the product by the user of the online system based on capacity and interest in the product
- hiding the historical purchasing data, the purchase capacity score, the purchase intent score, and the method determining the lead quality score, from the sponsor for the product;
- sending the lead quality scores associated with the leads to the sponsor for the product, such that the sponsor does not receive user information on which the lead quality score is based; and
- generating a new lead campaign based on the lead quality scores.

* * * * *